United States Patent [19]

Dattilo

[11] 4,158,212

[45] Jun. 12, 1979

[54] MAGNETIC TAPE HEAD AZIMUTH ASSEMBLY

[75] Inventor: Donald J. Dattilo, Mt. Prospect, Ill.

[73] Assignee: Motorola, Inc., Schaumburg, Ill.

[21] Appl. No.: 891,574

[22] Filed: Mar. 30, 1978

[51] Int. Cl.² .................................................. G11B 21/08
[52] U.S. Cl. ........................................ 360/109; 360/76
[58] Field of Search ................. 360/109, 104, 75–76, 360/106; 179/100.2 CA

[56] References Cited

U.S. PATENT DOCUMENTS

| 2,742,536 | 4/1956 | Uritis | 360/109 |
| 3,229,044 | 1/1966 | Kokke | 360/106 |
| 3,624,309 | 11/1971 | Dattilo | 360/106 |
| 3,692,314 | 9/1972 | Dattilo | 360/109 |
| 3,882,543 | 5/1975 | Richards | 360/109 |

FOREIGN PATENT DOCUMENTS

| 524589 | 12/1953 | Belgium | 179/100.2 CA |
| 1533031 | 6/1968 | France | 179/100.2 CA |
| 44-21032 | 2/1969 | Japan | 360/106 |
| 794974 | 5/1958 | United Kingdom | 360/109 |
| 1011865 | 12/1965 | United Kingdom | 179/100.2 CA |

*Primary Examiner*—John H. Wolf
*Attorney, Agent, or Firm*—Phillip H. Melamed; Melvin A. Klein; James W. Gillman

[57] ABSTRACT

An assembly for adjusting the azimuth (rotational) orientation of a magnetic tape head with respect to the chassis of a tape player is disclosed. A planar portion of a first plate is welded to the top side of a tape head and an adjustment screw is threaded through a bent portion of this plate. A planar portion of a resilient second plate is bonded to the bottom side of the tape head and a hollow cylindrical member is mounted to a bent portion of the second plate such that the resiliency of the second plate biases the hollow cylinder toward the adjustment screw. The hollow cylinder is slidably mounted on a guide post which is rigidly mounted to the chassis of a tape player. By means of the adjustment screw the angular disposition of the tape head with respect to the hollow cylinder, and thereby with respect to the tape player chassis, is altered.

8 Claims, 4 Drawing Figures

MAGNETIC TAPE HEAD AZIMUTH ASSEMBLY

BACKGROUND OF THE INVENTION

The present invention generally relates to the field of tape players in which an azimuth adjustment for a tape head is provided. More particularly, the present invention relates to cartridge tape players having a magnetic tape head which can be adjusted in both vertical and azimuth positions with respect to the chassis of the tape player.

In cartridge-type tape players it is generally necessary to adjust the vertical height of the magnetic tape head with respect to the chassis of the tape player such that the tape head can monitor different recorded tracks on magnetic tape contained in a cartridge. In addition, it is generally necessary to provide some sort of azimuth adjustment for the magnetic tape head such that the active sensing areas on the magnetic tape head can be properly aligned with respect to the recorded tracks on the magnetic tape contained in the cartridge.

A U.S. Pat. No. 3,869,724, assigned to the same assignee as the present invention, illustrates a typical vertical positioning mechanism for the tape head in a cartridge tape player wherein the vertical position of the tape head is controlled by the sequential rotation of a multi-surfaced cam. A U.S. Pat. No. 3,692,314 which is assigned to the same assignee as the present invention illustrates a prior art azimuth adjusting assembly for a tape head. Typically, prior art azimuth and vertical positioning assemblies for tape heads have been rather complex and costly due to the large number of parts employed. In addition, such assemblies generally utilized a large amount of vertical space. The present invention provides a simplified, inexpensive and thin azimuth and vertical positioning assembly, and therefore represents a significant advance over the prior art magnetic tape head positioning assemblies.

SUMMARY OF THE INVENTION

An object of the present invention is to provide an improved, simplified and thin magnetic tape head azimuth adjustment assembly for a tape player which overcomes the aforementioned deficiencies.

A more particular object of the present invention is to provide a magnetic tape player having a thin vertical and azimuth position assembly which is less expensive and requires fewer parts.

In one embodiment of the present invention, an improved magnetic tape head azimuth assembly is provided. The assembly comprises: a magnetic tape head having at least two external sides; first plate means attached to one of said external sides of said tape head; second plate means formed of a resilient material and attached to another of said external sides of said tape head; an adjustable means attached to one of said plate means for adjustable relative movement with respect thereto, the other of said plate means having an extending portion; and a member fixed to said extending portion and having a predetermined angular disposition with respect to said tape head, said tape head, said first and second plate means, said adjustable means and said member forming an assembly with said adjustable means being biased into contact with said member, whereby movement of said adjustable means with respect to said first plate means alters the angular disposition of said tape head with respect to said member.

Basically, a tape player is provided which utilizes the azimuth assembly described in the preceding paragraph wherein the member fixed to said extending portion of said plate means comprises a hollow cylinder which is slidably mounted around a guide post fixed to the tape player chassis, and wherein a projection from one of said first and second plate means in combination with a bias spring and a multi-surface cam creates a combination azimuth and vertical position assembly for the tape player which has a relatively thin vertical dimension.

BRIEF DESCRIPTION OF THE DRAWING

For a more complete understanding of the invention reference should be made to the drawings, in which.

DESCRIPTION OF THE PREFERRED EMBODIMENT

Figure 1:
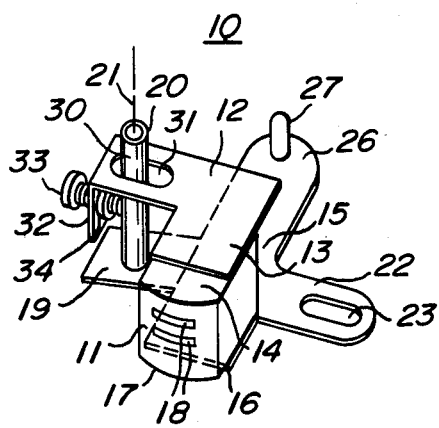
FIG. 1 is a perspective view of a magnetic tape head azimuth adjustment assembly.

FIG. 1 illustrates a magnetic tape head azimuth adjustment assembly 10 which includes a magnetic tape head 11, a rigid first plate 12 having a planar portion 13 welded to an external planar top surface 14 of the magnetic head 11 and a second plate 15 having a planar portion 16 welded to an external bottom planar surface 17 (parallel to surface 14) of the tape head 11 which opposes the surface 14. The tape head 11 has active sensing areas 18 on the front surface of the tape head which allow the head to monitor and record signals in conjunction with a magnetic tape (not shown) contained in a tape cartridge (not shown).

Figure 3:
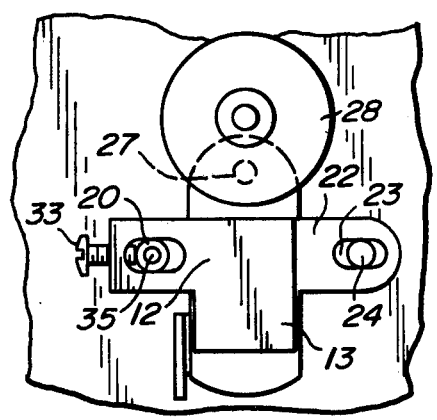
FIG. 3 is a top view of the tape player portions shown in FIG. 2.
Figure 4:
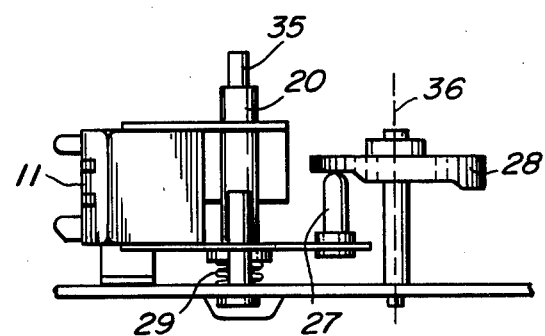
FIG. 4 is a side view of the tape player portions shown in FIG. 3.

The second plate 15 is formed from a resilient planar material which is more resilient that the material forming plate 12. An extending portion 19 forms a bent portion of the plate 15 which is non-planar with respect to the planar portion 16. A hollow cylindrical member 20 essentially forms a tubular bushing which is rigidly attached to and extends through the extending bent portion 19 of the plate 15, whereby a longitudinal axis 21 of the cylindrical member 20 has a predetermined angular disposition with respect to the magnetic tape head 11 and the sensing elements 18 thereon. The second plate 15 has a sideways extension 22 (as seen in FIG. 1) having a slot 23 for cooperation with the stabilizer post 24 (see FIG. 2) firmly mounted to a chassis 25 of a tape player. The second plate 15 also has a rearward extension 26 (as viewed in FIG. 1) having a cam follower member 27 mounted thereon and extending toward the plane of portion 13 for engagement with a multiple position multi-surfaced rotary cam 28 positioned at a fixed distance from said chassis which control the vertical position of the tape head 11 as viewed in FIGS. 1, 2 and 4. A spring 29 is schematically illustrated in FIGS. 3 and 4 and is coupled to the azimuth adjustment assembly 10 and provides upward vertical bias to the assembly such that the cam follower 27 contacts the multi-surfaced cam 28 such that the cam 28 determines the vertical position of the azimuth adjust assembly 10 which includes the magnetic head 11. The extensions 26 and 22 are coplanar with the planar portion 16 of the second plate 15.

The first plate 12 has a sideways extension 30 which is coplanar with the portion 13 and includes a slot 31 through which the cylindrical member 20 passes. A 90° bent portion 32 extends downward from the planar extension 30 toward the plane of portion 16 and has an adjustment set screw 33 threaded through a bushing 34 attached to the bent portion and into contact with the cylindrical member 20. The resiliency of the second plate 15 provides a spring bias force which biases the adjustable screw 33 into contact with the cylindrical member 20.

Figure 2:
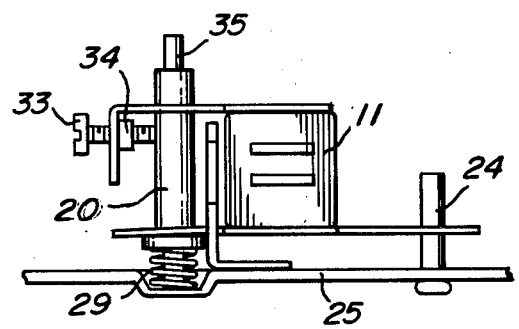
FIG. 2 is a front planar view of portions of a tape player utilizing the azimuth adjustment assembly shown in FIG. 1.

A guide post 35 is rigidly fixed to the chassis 25 at a fixed angular position with respect thereto and the cylindrical member 20 of the azimuth assembly 10 is slidably mounted around the guide post 35, as shown in FIG. 2. This structure, in combination with the biasing spring 29, the rotary cam 28 and the cam follower 27 provides for selectively vertically positioning the entire azimuth assembly 10 with respect to the chassis 25 in response to rotation of the cam 28 about an axis 36. Therefore also the head is adjusted with respect to any magnetic tape contained in a cartridge inserted into the tape player which the chassis 25 forms a part of.

The azimuth adjustment assembly 10 shown in FIG. 1 is a self-contained assembly and provides a simplified and low vertical profile azimuth adjusting assembly. The term "low profile" is used to indicate that the mechanism for adjusting the orientation of the magnetic head 11 with respect to the chassis 25 does not require any substantial vertical space (along axis 36) as viewed in FIGS. 1, 2 and 3. Thus the azimuth adjustment assembly of the present invention permits the construction of a low profile tape player besides providing a simplified and inexpensive azimuth adjustment assembly combined with a vertical positioning assembly for the magnetic head 11.

FIG. 1 illustrates the azimuth adjustment assembly 10 before the assembly has been mounted in a tape player and before any adjustment of the rotational orientation of the magnetic head 11 with respect to the chassis 25 has occurred. FIG. 2 illustrates the azimuth assembly 10 after it has been mounted in a tape player on the guide post 35 and stabilizer post 24, and after the assembly 10 has been adjusted such that the tape head 11 is properly oriented with respect to the chassis 25. The rotational adjustment of the orientation of the head 11 with respect to the chassis 25 occurs by turning the azimuth adjustment screw 33 such that the angular disposition between the tape head 11 and the cylindrical member 20 is altered despite the spring bias provided by the resilient plate 15.

Essentially, the resilient plate 15 supplies the rotational adjustment spring bias for the azimuth adjustment assembly 10. The orientation of the tape head 11 with respect to the cylindrical member 20, and the guidepost 34 that is rigidly attached to the chassis 25, is determined by the position of the azimuth set screw 33 with respect to first plate 12. The slots 23 and 31 are required so as to permit the movement of the stabilizer post 24 and the cylindrical member 20 with respect to the plates 15 and 12, respectively, during the adjustment of the azimuth position of the tape head 11.

Details of the operation of the rotary cam 28 which controls the vertical position of the tape head 11 have not been discussed herein since such mechanisms are well known to those of skill in the art and the details of those mechanisms do not form part of the present invention.

From the preceding descriptions and the accompanying figures, it is apparent that a low profile magnetic tape head azimuth adjustment assembly for a tape player has been provided which has a minimum vertical dimension, contains only a few component parts and should be inexpensive to manufacture. While I have shown and described specific embodiments of this invention, further modifications and improvements will occur to those skilled in the art. All such modifications which retain the basic underlying principles disclosed and claimed herein are within the scope of this invention.

I claim:

1. A magnetic tape player having a chassis and a magnetic tape head which can be adjusted in vertical and azimuth positions with respect to the chassis, comprising:
   a chassis;
   a tape head azimuth assembly mounted with respect to said chassis, said azimuth assembly including,
   a magnetic tape head having at least two opposed external sides,
   first plate attached to one of said external sides of said tape head,
   second plate attached to another of said external sides of said tape head,
   said second plate being resiliently mounted with respect to said first plate,
   an adjustable means attached to one of said plates for adjustable relative movement with respect thereto, the other of said plates having an extending portion, and
   a hollow cylindrical member fixed to said extending portion and having a predetermined angular disposition with respect to said tape head, said adjustable means being biased into contact with an exterior surface of said member by said resilient second plate;
   a guide post fixed to said chassis at a fixed angular disposition, and said cylindrical member slidably mounted around said guide post;
   a cam follower attached to an extension of one of said first and second plates;
   a multi-surfaced cam means for determining various vertical positions of said azimuth assembly with respect to said chassis; and
   spring bias means urging said cam follower into contact with said multi-surfaced cam;
   whereby movement of said adjustable means with respect to said one plate to which it is attached alters the angular disposition of said tape head with respect to said chassis, and said azimuth assembly is selectively positioned at various vertical positions with respect to said chassis by said spring bias means and said multi-surfaced cam means cooperating with said cam follower on said extension of one of said first and second plates.

2. A magnetic tape player according to claim 1 wherein said two external sides are opposite parallel sides of said tape head.

3. A magnetic tape player according to claim 2 wherein said first plate has a planar portion mounted to said tape head and said adjustable means comprises a set screw mounted through a bent portion of a coplanar extension of said first plate planar portion, said bent portion being non-coplanar respect to said extension of said first plate.

4. A magnetic tape player according to claim 3 wherein said second plate comprises a planar portion mounted to said tape head and a bent portion with respect to said planar portion, said cylindrical member being mounted on said bent portion.

5. A magnetic tape player according to claim 4 wherein said cylindrical member protrudes through a slot in said first plate and said bent portion of said first plate means extends toward the plane of said second plate planar portion.

6. A magnetic tape player according to claim 5 wherein said cam follower is mounted on a coplanar extension of the portion of said second plate mounted to said tape head and comprises a projection extending generally toward the plane of said first plate planar portion.

7. A magnetic tape player according to claim 1 wherein said guide post passes through said bent portion of said second plate, said hollow cylindrical member and said slot in said first plate.

8. A magnetic tape player according to claim 7 which includes a stabilizer post mounted to said chassis and extending through a slot in a coplanar extension of the portion of said second plate mounted to said tape head.

* * * * *